Oct. 4, 1966 C. A. MATHEWS 3,277,344
STATIC PROTECTIVE RELAYS

Filed Feb. 6, 1963 3 Sheets-Sheet 3

INVENTOR:
CHARLES A. MATHEWS,
BY Albert S. Richardson Jr.
ATTORNEY.

3,277,344
STATIC PROTECTIVE RELAYS
Charles A. Mathews, Springfield, Pa., assignor to General Electric Company, a corporation of New York
Filed Feb. 6, 1963, Ser. No. 256,700
15 Claims. (Cl. 317—36)

This invention relates to static relays for protecting electric power transmission lines, and more particularly it relates to secure distance relays which employ no moving parts.

Fast operation, maximum reliability and security, low burden, and minimum maintenance are well known objectives of protective relaying designers. In furtherance of these interrelated goals, a good deal of attention is currently being given to the application of semiconductor technology in the art of protective relaying. The present invention is related to this effort. It is a general objective of my invention to provide improved fault responsive distance relays in which transistors and other semiconductor or "static" devices can be used to advantage. But while the distinctive characteristics and attributes of such static devices are contemplated in the preferred embodiment of my invention, it will be apparent hereinafter that the invention is not limited to the exclusive use of these particular components.

There are several known techniques for designing distance relays having no moving parts. For example, such relays are disclosed in reissue patent Re. 23,430, Warrington, originally granted on June 13, 1950, and in Patent No. 2,879,454 granted on Mar. 24, 1959 to M. E. Hodges et al. While these designs enable the benefits of static circuitry to be realized in practice, I have found them more susceptible than conventional electromechanical distance relays to certain transient phenomena which jeopardize their security. Accordingly, a more specific object of the present invention is the provision, in a transmission line protective relay of the character referred to, of improved means for preventing false operation of the relay when non-fault disturbances affect the protected line.

The kinds of line disturbances to which static distance relays tend falsely to respond are best illustrated by considering the operation of a complete protective relaying system of the directional-comparison type which employs such relays. The function of the complete protective system is to initiate the simultaneous opening or tripping of high-speed circuit interrupters, which are located at the respective ends or terminals of an electric power line being protected, in quick response to a fault or short circuit occurring on the protected line. Of course, this operation should not take place in the event of an "external" fault, i.e. one occurring at some point in the power system beyond a terminal of the protected line. This intended function may be accomplished by providing, at each terminal of the line, appropriate fault detecting and directional sensing distance relays arranged to operate upon the occurrence of a line fault that appears to be internal, by comparing the operative state of said relays at the respective terminals, and by initiating tripping only if this comparison reveals that the fault appears internal as viewed from every one of said terminals.

In order to make this directional comparison, it is necessary to interconnect the different terminals of the protected line by means of a pilot channel which can communicate appropriate intelligence therebetween. A variety of methods of obtaining the desired intercommunication are known, including in high-voltage transmission line relaying practice the use of carrier current or microwave transmission wherein a high-frequency continuous signal transmitted at each line terminal is almost instantly received at all other terminals. This signal is utilized to prevent or block tripping of the circuit interrupter located at each receiving terminal. The intended protective function may then be accomplished by arranging the relaying system to operate specifically as follows: Upon the incidence of a fault, signal transmission is immediately started at every terminal where a fault detecting distance relay responds thereto, without regard to whether the fault is external or internal; subsequently this transmission is stopped at each terminal whose directional sensing distance relay responds because the fault is located on the protected-line side of that terminal; the latter relay additionally attempts to trip the local circuit interrupter under like conditions; but tripping is blocked unless signal transmission stops at every terminal, indicating agreement by all of the directional sensing distance relays that the fault is in fact internal.

The above-mentioned directional sensing distance relay is known in the art as a mho relay. When high-speed static mho relays of known design are employed in the directional-comparison relaying system outlined above, they may respond falsely:

(1) While an external fault subsists near the local terminal of the protected line (i.e., near the terminal at which the falsely responding mho relay is located).

(2) following the clearing of such a nearby external fault; or (3) when the protected line is initially energized, or returned to service.

Accordingly, a further object of the present invention is the provision of improved static protective relays which are immune to the enumerated power system disturbances.

It is another object of this invention to provide a reliable and secure static distance relay whose operation is blocked whenever false-operation inducing voltage conditions are present on the transmission line being protected.

In carrying out my invention in one form, a distance relay for initiating a predetermined control function in response to the occurrence of a fault on an A.C. electric power transmission line is provided with static circuit means arranged to operate whenever the relationship between line-voltage and line-current derived quantities supplied thereto indicates that a fault has occurred on the protected line. The relay includes control means connected to the aforesaid static circuit means for effecting the initiation of said predetermined control function in response to operation of the circuit means, and it also includes protective means connected to the control means and adapted to be energized by an A.C. voltage depedent on steady state line voltage.

In one aspect of my invention, the protective means is arranged to disable the control means thereby preventing the initiation of the predetermined control function, unless activated in response to the instantaneous magnitude of its energizing voltage being above a predetermined level, whereby false operation of the relay under certain low voltage conditions is avoided. In another aspect of the invention, the aforesaid protective means includes time delay means arranged to delay initial activation of the protective means, following a period of inactivation thereof, for a predetermined short interval of time after the energizing voltage attains a predetermined instantaneous magnitude, whereby false operation of the relay is prevented when line voltage recovers after a low voltage condition. In yet another aspect of the invention, I ensure correct response of the relay to any low voltage fault on the protected line, under all possible circumstances, by so interconnecting the protective means and the static circuit means that the protective means is activated, on the elapse of said predetermined interval of time, in response to operation of the static circuit means, regardless of how low the instantaneous magnitude of its energizing voltage may then be.

My invention will be better understood and its various objects and advantages will be more fully appreciated from the following description taken in conjunction with the accompanying drawings in which.

Figure 1:
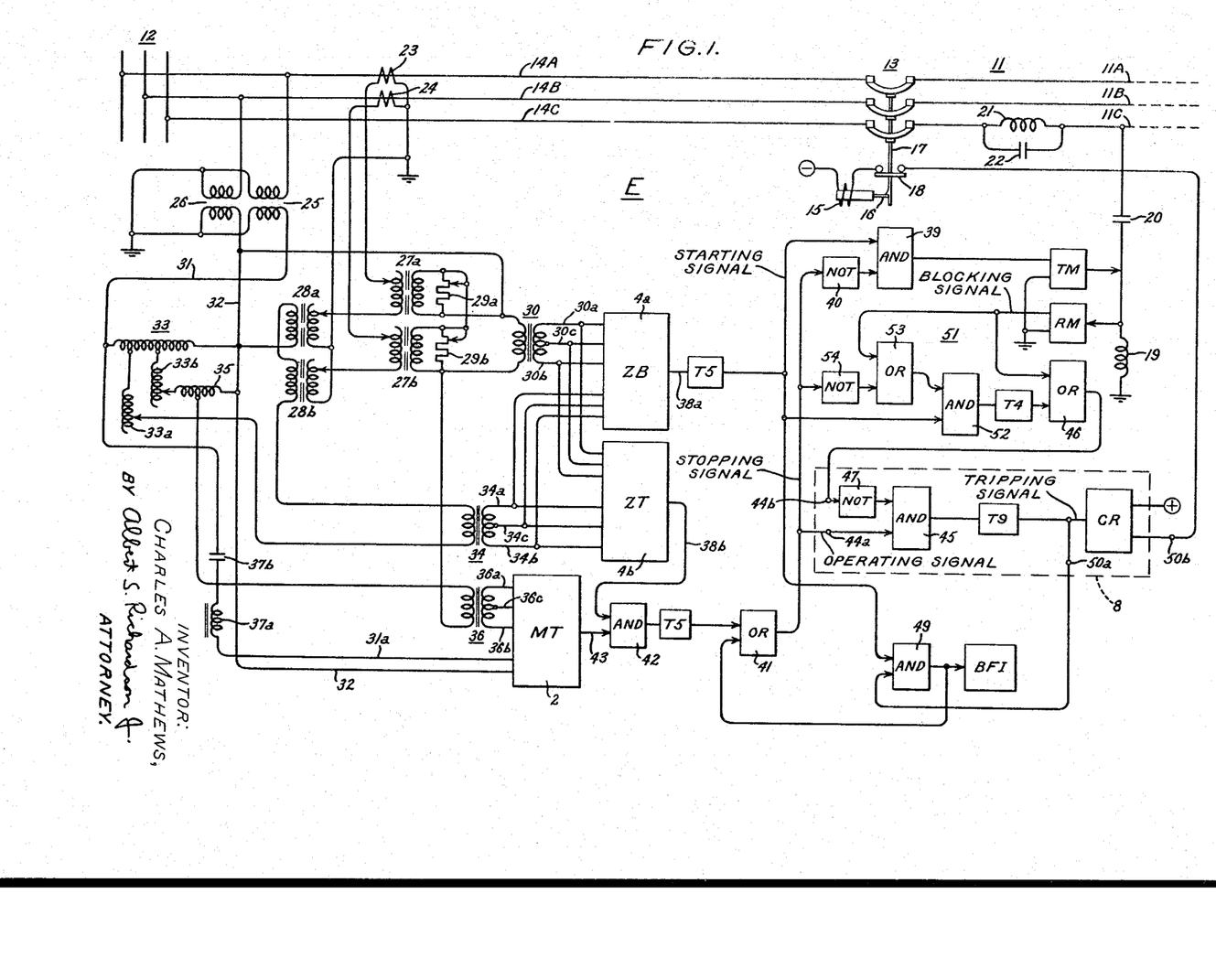
FIG. 1 is a schematic circuit diagram, partly in block form, of a phase fault responsive directional-comparison protective relaying system in which my invention is embodied, this diagram showing system components at only one of at least two similar, distantly spaced terminals of an electric power transmission line being protected by the relaying system.

FIGURE 1

Referring now to FIG. 1, I have shown schematically and in block form, for the purpose of illustrating a preferred embodiment of my invention, one terminal of a phase fault directional-comparison protective relaying system for a 3-phase alternating-current electric power transmission line 11 comprising conductors 11A, 11B and 11C. These phase conductors represent a section of a high-voltage electric power system which is used for conducting alternating current of power frequency, such as 60 cycles per second, between distantly spaced terminals of the protected line 11. In order to avoid compounded drawing details that are unnecessary for a full and clear understanding of my invention, there has been set forth in FIG. 1 equipment and relaying components at only one line terminal, identified generally by the reference letter E, and it should be understood that everything therein associated with this particular terminal is essentially duplicated at each line terminal remote therefrom (except the relative polarities of the coupling between the relaying system and the electric power line which, at any remote terminal, will be the mirror image of the polarity shown at terminal E).

As is indicated in FIG. 1, the transmission line 11 is connected at its terminal E to a power source (or load) bus 12 by way of a 3-pole circuit interrupter 13 and three conductors 14A, 14B and 14C of relatively short lengths. The local components of the protective relaying system are appropriately coupled to these short phase conductors. It is the function of the relaying system to initiate opening of the circuit interrupter 13 in high-speed response, and substantially simultaneously with like action at each remote terminal of the protected line, to the occurrence of an internal phase fault, i.e., upon the occurrence of a short circuit between two or more of the phase conductors at any point along the protected line 11. Under such conditions the relaying system is so arranged as to connect a trip coil 15 of the circuit interrupter 13 to a dependable source of energy, such as a station battery which is represented in FIG. 1 by the encircled plus and minus symbols, and when thus energized the trip coil 15 actuates a latch 16 thereby releasing switch member 17 of the circuit interrupter for rapid circuit opening movement. A "normally open" auxiliary contact 18 of the circuit interrupter is connected in series with the trip coil 15 to deenergize the same during the circuit opening operation.

The necessary intercommunication between duplicate relaying equipments at the respective line terminals is accomplished in the illustrated embodiment of the invention by utilizing conductor 11C as a pilot channel for the transmission of high-frequency carrier current. Each terminal is equipped with transmitting means TM for generating, upon activation of the transmitter in response to a suitable control signal, a continuous carrier-current communicative signal of high frequency (such as 100,000 cycles per second). An inductance element 19, as can be seen in FIG. 1, is connected between ground and a coupling capacitor 20 which in turn is connected to the phase conductor 11C, and a connection is made from the output of transmitter TM to the junction of elements 19 and 20. The capacitor 20 is designed with sufficient insulation to withstand line voltage, and it easily passes high-frequency carrier current while presenting a high impedance to the transmission line current of power frequency. At each end of the transmission line 11 a parallel resonant circuit comprising an inductance 21 and a capacitor 22 tuned to the carrier-current frequency is connected in series circuit relationship with conductor 11C to provide a wave trap which confines the carrier current to the protected line without introducing any appreciable impedance to current of power frequency flowing through this conductor.

The high-frequency communicative signal generated by the transmitter TM when activated will cause carrier current to flow in a loop comprising transmitter TM, coupling capacitor 20, conductor 11C, the corresponding coupling capacitor and a receiver at a remote terminal, and a ground return path. As is indicated in FIG. 1, each line terminal is equipped with receiving means RM which is similarly connected to the junction of coupling capacitor 20 and inductance element 19. The receiver RM is tuned to the frequency of the carrier current transmitted by transmitting means at a remote terminal, and hence it is operably energized by the communicative signal received from the remote terminal. In practice, the carrier-current transmitters TM located at the respective line terminals are usually arranged to oscillate at a common frequency, whereby the local receiver RM actively responds to the communicative signal originating from the companion transmitter as well as that received from the distant or remote transmitter. Since the relaying system utilizes carrier current for blocking purposes only (to prevent relay operation in the event of an external fault), proper operation of the system will be obtained even if carrier current were discontinued due to a failure of the pilot channel 11C itself (indicating an internal fault).

Although a carrier-current form of communicative signal has been shown and described in the preferred embodiment of my invention, those skilled in the art will recognize that other known methods of intercommunication could alternatively be employed. For example, a microwave pilot channel is appropriate for this purpose, in which case it is common practice to arrange the signal transmitters TM at the respective line terminals to operate at different frequencies. The relaying system will function successfully in such a setting. The system is also well suited for protecting transmission lines having either two or three terminals, and wherever for convenience I herein refer in the singular to a line terminal remote from the local terminal E, it is not my intention to limit the system's application to only a 2-terminal line.

In order to detect the occurrence of a phase fault in the electric power system and to sense its direction, the components of the protective relaying system at the local terminal E are coupled to the transmission line by means comprising a pair of Y-connected instrument current transformers 23 and 24 associated, respectively, with conductors 14A and 14B, and a pair of Y-connected instrument potential transformers 25 and 26 which are coupled respectively to the same two conductors. The secondary currents of the current transformers 23 and 24 are therefore representative of transmission line current flowing locally in phase conductors 11A and 11B, respectively, while the voltage derived across the secondary windings of the potential transformers 25 and 26 is proportional to the line-to-line voltage between these conductors at terminal E. The individual relays ZB, ZT and MT which are connected to these transformers in the manner shown in FIG. 1 are arranged to operate in response to certain critical relationships between these representative quantities arising upon the occurrence of any fault which involves both of the phase conductors 11A and 11B of the protected transmission line. Complete response to phase-to-phase faults involving conductors 11B and 11C or conductors 11C and 11A is obtained in practice by providing additional current and potential transformers coupled to the conductor 14C and by providing two more duplicate sets of relays similarly connected thereto.

As can be seen in FIG. 1, the secondary circuit of current transformer 23 includes the primary windings of two "transactors" 27a and 28a, while the secondary circuit of current transformer 24 includes the primary windings of two companion transactors 27b and 28b. A transactor is a known device having electrical characteristics similar in some respects to a conventional transformer and similar in other respects to a reactor. In effect, it is an air-gap reactor having associated therewith primary and secondary windings, with a load circuit being connected to the secondary winding.

The voltage developed across the secondary winding of each transactor is accurately representative, both in magnitude and phase, of the net primary current energizing it. Secondary voltage is related to primary current by a complex proportionality constant or vector operator known as the transfer impedance of the transactor. The transfer impedance, and hence the absolute magnitude of the secondary voltage and the specific angle by which this voltage leads the net primary current, can be controlled by varying the amount of load in the secondary circuit. The dimensions of the air gap in the transactor core and the selection of its turns ratio also affect the magnitude of the secondary voltage relative to the primary current. Open circuit secondary voltage leads primary current by nearly 90 electrical degrees, and as the resistive load across the secondary is increased, the angle of lead becomes less. Although not shown in FIG. 1, suitable surge suppressing means can be provided in the secondary circuit of each transactor.

As can be seen in FIG. 1, the secondary windings of the transactors 27a and 27b, shunted by rheostats 29a and 29b respectively, are interconnected in polarity opposing series relationship across an isolating transformer 30. Opposite ends or terminals of the secondary winding of the transformer 30 are connected to leads 30a and 30b, respectively, and a tap midway between the ends of this winding is connected to a lead 30c. With this arrangement a voltage proportional to the vector difference between the transmission line currents flowing in conductors 11A and 11B at the local terminal E is developed across each half of the secondary winding of transformer 30. The leads 30a, 30b and 30c supply this voltage to a relay component 4a shown in FIG. 1 as a block labeled "ZB," and this voltage comprises an A.C. operating quantity for the ZB component.

The secondary windings of the Y-connected potential transformers 25 and 26 are connected between ground and wires 31 and 32, respectively. As can be seen in FIG. 1, an autotransformer 33 is connected between the wires 31 and 32. The autotransformer has two extended windings 33a and 33b shown schematically in the drawing, and these extended windings are conductively connected to two different coarse taps of the main winding of the autotransformer. The main and both of the extended windings are actually all wound on a single magnetizable core (not shown). Each of the extended windings 33a and 33b has a vernier tap, and the voltages between these taps and wire 32 will be seen to be representative of the line-to-line voltage across conductors 14a and 14b of the electric power system.

The portion of the autotransformer 33 tapped from its extended winding 33a, in series with the secondary windings of the transactors 28a and 28b, which windings are interconnected in polarity opposing relationship with each other, is connected across an isolating transformer 34. Opposite ends or terminals of the secondary winding of transformer 34 are connected to leads 34a and 34b, respectively, and a tap midway between the ends of this winding is connected to a lead 34c. With this arrangement a voltage is developed across each half of the secondary winding of transformer 34 that is proportional to the vectorial combination of line voltage and a voltage representative of the vector difference between line currents flowing locally in conductors 11A and 11B, the latter voltage being related to line current by a complex proportionality constant which is dependent on the transfer impedance of the transactors 28a and 28b. The leads 34a, 34b and 34c supply the secondary voltage of transformer 34 to the ZB component, and this voltage comprises an A.C. restraining quantity for the ZB component.

The portion of the autotransformer 33 that is tapped from its extended winding 33b has connected thereacross another autotransformer 35 which is midtapped as indicated in FIG. 1. The tapped portion of the autotransformer 35 is connected in series with the interconnected secondary windings of transactors 27a and 27b across an isolating transformer 36. Leads 36a and 36b are connected to opposite ends or terminals of the secondary winding of transformer 36, and a lead 36c is connected to a midtap of this winding. With this arrangement the voltage developed across each half of the secondary winding of transformer 36 is proportional to line voltage V vectorially combined with a voltage representative of the vector difference between the aforesaid line currents, the latter voltage being related to line current I by a complex proportionality constant $\overline{Z}$ which is dependent on the transfer impedance of transactors 27a and 27b. The leads 36a, 36b and 36c supply the secondary voltage of transformer 36 to a relay component 2 shown in FIG. 1 as a block labeled "MT," and this voltage comprises an A.C. operating quantity for the MT component. The MT component is additionally energized in accordance with line voltage as reflected by the potential transformer secondary voltage taken across wires 31 and 32, with wire 31 being connected to this component through a series LC memory circuit, comprising inductance and capacitance elements 37a and 37b, and a lead 31a. The leads 31a and 32 supply to MT a line-voltage derived A.C. reference quantity which, due to the memory circuit, is approximately two-thirds the magnitude of the steady state secondary voltage of the potential transformers 25 and 26.

The ZB component (4a) of the relaying system is intended to detect the occurrence of a phase fault in the electric power system on or near the protected line 11 by operating in high-speed response to the relationship between line voltage and current values which exist in conductors 11A and 11B at the local terminal E under such conditions. This component is the kind of fault responsive means known in the art as a distance relay. It is a function of distance relay ZB when in operation to activate the signal transmitter TM thereby starting the transmission of carrier current from the local terminal E.

The MT components (2) of the relaying system is intended to sense the direction in which the above-mentioned phase fault is located, with respect to the local terminal, by operating in high-speed response to a characteristic relationship between line voltage and current which exists at the local terminal E when the fault is located on the protected-line side thereof. Hence a phase fault between conductors 11A and 11B of the protected line 11 (or in the power system connected to these conductors for a certain distance beyond the remote terminal of the line) will cause MT to operate, while a phase fault on the adjoining bus 12 (or nearby on other transmission lines connected to this common bus) will not. MT when operating performs two functions (both requiring the contemporaneous operation of relay ZT, as will be explained below): It immediately deactivates the associated transmitting means TM, thereby stopping the transmission of carrier current from the local terminal; and after a short delay it attempts to open or trip the circuit interrupter 13. This attempt to trip is blocked so long as the local receiving means RM is receiving carrier current from an active transmitter located at any other terminal of the line. Thus the relaying system will initiate tripping of the circuit interrupters at the respective terminals of the protected line only if the MT component is operating at every terminal whose fault responsive distance relay ZB has operated, which state indicates that the fault has occurred in fact on the protected line.

Preferably the MT component shown in FIG. 1 comprises a distance relay designed for inherent directional response, being well known in the art as a "mho" type relay. While such a relay may be constructed in a variety of different ways, I prefer, in furtherance of the goal of high-speed operation, to utilize a construction which employs what I call a "block-spike" principle of operation. This principle is disclosed in the aforesaid reissue patent Re. 23,430, Warrington, and it will be further explained hereinafter in connection with the circuit diagram of relay MT in its preferred form, illustrated in FIG. 2. For the present it will suffice to understand that the desired mho characteristic is obtained in the contemplated relay by making a comparison of the instantaneous values of the two components comprising its A.C. operating quantity (representative of $\overline{V}$ and $\overline{IZ}$, respectively) every time the instantaneous magnitude of its line-voltage derived reference quantity is maximum. If IZ has the same polarity and a higher instantaneous magnitude than V at the instant this comparison is made, the relay will immediately produce an output signal which is taken therefrom by means of a lead 43.

A mho relay of this kind will have a sawtooth characteristic of operating time v. phase angle of fault initiation. It operates only at moments of maximum or peak line voltage. If a fault within its reach should occur just after line voltage has passed its cyclic peak, the operating time will then be approximately one-half cycle (8.33 milliseconds on a 60 c.p.s. power frequency basis). On the other hand, if a fault should occur immediately before a voltage maximum, the operating time is virtually zero.

While the preferred construction of the mho relay MT contributes significantly to the ultra-high speed operation of the relaying system when an internal phase fault occurs, it aggravates the problem of preventing false operation of the system under all external fault conditions. In order to prevent improper response by the system to any external fault occurrence, it is important that the carrier starting function of the fault responsive distance relay ZB be effected sufficiently in advance of the tripping function of the directional sensing mho relay MT to ensure that the blocking function of the local receiver RM has been established, in response to operation of ZB at a remote terminal of the protected line (which response will be delayed by the measurable time required for carrier current communication), before tripping can be initiated at the local terminal due to MT operating when a phase fault occurs beyond the remote terminal. On the other hand, this time coordination should be as short as possible in order to avoid unwanted delay in the response of the relaying system to all internal faults, when high-speed tripping is of primary importance.

According to the teachings of Harold T. Seeley, as set forth in his copending patent application S.N. 256,622, filed on Feb. 6, 1963, and assigned to the assignee of the present application, proper time coordination between opposite terminals of the line is obtained and the shortest possible tripping delay is preserved by providing an association with the mho relay MT the additional phase fault responsive relay component 4B shown in FIG. 1 as a block labeled "ZT." The ZT block represents a kind of fault responsive means known in the art as a distance relay, and it is of the same construction as the other distance relay ZB. Preferably both of the relays ZB and ZT are fast operating distance relays of the impedance type, and they may for example utilize an "opposed-voltage" construction the operating principle of which is explained in the aforesaid Patent No. 2,879,454, Hodges et al. Each of the relays ZB and ZT therefore operates whenever the magnitude of a D.C. operating voltage (derived from the A.C. operating quantity supplied to the relay) exceeds the magnitude of a D.C. restraining voltage (derived from the A.C. restraining quantity supplied thereto), and when in operation they produce output signals which are taken therefrom by means of leads 38a and 38b, respectively.

The additional distance relay ZT is arranged to supervise operation of the mho relay MT, this supervision being accomplished in a manner soon to be explained. For reasons discussed at length in the aforesaid Seeley application the supervising distance relay ZT at each terminal of the protected line is supplied with line-derived quantities which are nearly the same as those supplied to the relay ZB located at the opposite terminal, so long as the line extending therebetween is sound, and these two relays are so arranged that the latter has a greater ohmic reach and a faster speed of operation than the former. Preferably, as is illustrated in FIG. 1, the leads 30a, 30b and 30c from the transformer 30, and also the leads 34a, 34b and 34c from the transformer 34, are connected to the local relay ZT, whereby this relay is actually supplied with the same operating and restraining quantities supplied to the companion relay ZB at the same terminal and by selecting the transfer impedance of the transactors 28a, 28b at the respective line terminals in the manner taught by Seeley, the desired equality of restraining quantities at opposite terminals is obtained.

In FIG. 1 I show schematically the control means and circuitry by which the impedance relays ZB and ZT, the mho relay MT and the receiving means RM are able to carry out the various functions that have been assigned to them. The diagram includes a number of symbolically illustrated "logic units," and an explanation of the symbols employed will now be offered. Each block labeled "OR" represents a circuit or unit which is in an operative state (its output is "on") whenever either (or both) of two alternative inputs is "on." Each "AND" block represents a circuit or unit whose output signal is "on" only when all of the identified inputs are concurrently on. The output of a "NOT" block is "on" only when its input signal is "off," and therefore, when used in conjunction with either the OR or the AND unit, it enables the operation of that unit to be controlled in accordance with the absence rather than the presence of its input.

The general operation of the protective relaying system shown at the transmission line terminal E in FIG. 1 can now be readily followed. As previously stated, it is desired to open the circuit interrupter 13 in high-speed response to the occurrence of an internal phase fault, which condition is indicated by the operation of the directional sensing mho relay MT and the inoperation of the carrier-current receiving means $\overline{\text{RM}}$ (because no carrier current is being transmitted from any remote terminal of the protected line). As a corollary, it is desired to prevent tripping under all external phase fault conditions, as indicated by either the absence of MT operation or the presence of received carrier current by RM.

In order to accomplish both of these objectives, the relaying system is so arranged that upon the occurrence of any phase fault detected by the fault responsive impedance relay ZB, regardless of the particular location of the fault, this fast operating relay will operatively energize a pulse stretching component T5 to which it is connected by the lead 38a. The pulse stretching component T5 responds by substantially instantaneously developing a continuous "starting" signal, and this starting signal is supplied to an AND logic unit 39 which is connected to the local carrier-current transmitter TM to control its activation. The AND unit 39, as can be seen in FIG. 1, is additionally provided with a NOT input 40 which is responsive to a "stopping" signal supplied thereto, via an OR logic unit 41, another pulse stretching component T5, an AND logic unit 42 and the parallel leads 43 and 38b, upon contemporaneous operations of the mho relay MT and its supervising impedance relay ZT. Since ZT always operates more slowly than ZB, the stopping signal is initially absent, and consequently the NOT input to the AND unit 39 is initially on. Unit 39 comprises suitable control means for producing, in instantaneous response to energization by the starting signal, a dependent output control signal which causes activation of TM and hence starts continuous carrier current transmission from the line terminal E. Later, if and when a stopping signal is supplied to the NOT unit 40, the control means of unit 39 will be rendered ineffective to produce its output control signal which is then cut off or discontinued, thereby deactivating TM and stopping carrier-current transmission from the local terminal. With this arrangement, carrier-current is always started upon the occurrence of a phase fault and is subsequently stopped when the stopping signal appears.

The mho relay MT is designed to operate if the phase fault condition has occurred on the protected-line side of the local terminal E. The supervising relay ZT will operate in response to any fault detected by ZB. Upon operation of both MT and ZT, their respective output signals are concurrently supplied to the AND unit 42 which is turned on thereby. The Unit 42, when on, energizes the pulse stretching component T5 which in turn responds immediately by developing, as is indicated in FIG. 1, an "operating" signal as well as the above-mentioned stopping signal. This operating signal is conveyed from the OR unit 41 to an input terminal 44a of a control circuit 8.

Within the control circuit 8, the operating signal when energizing the input terminal 44a is supplied to an AND logic unit 45. As is shown in FIG. 1, a second input for this AND unit 45 is derived from the local carrier-current receiving means RM. The receiving means, when it is activated by carrier current transmitted from a remote terminal of the protected line, produces a continuous "blocking" signal which is channeled via an OR logic unit 46, an input terminal 44b and a NOT logic unit 47 to the AND unit 45 of circuit 8. The presence of a blocking signal activates the NOT unit 47 which maintains the AND unit 45 in an "off" state. The combination of units 45 and 47 therefore comprises means for comparing the operating signal to the blocking signal and for keying the succeeding portion of the control circuit only when the former signal is present in the absence of the latter.

The AND unit 45, when on, energizes a timing component T9 of the control circuit 8, and upon the expiration of a predetermined short time delay the timing component thereafter will produce an output. This timing component may take any suitable form, such for example as the time delay pickup and instantaneous dropout circuit which is the claimed subject matter of a copending patent application S.N. 321,072, Scharf, filed on Nov. 4, 1963, and assigned to the assignee of the present application. As is indicated in FIG. 1, its output comprises a "tripping" signal which is utilized to initiate operation of a static switch represented by the block labeled "CR," whereupon the static switch quickly "closes" to cause energization of the trip coil 15 of the local circuit interrupter 13. A dual purpose is served by the relatively short time delay (e.g., 3 milliseconds) which the timing component T9 introduces in the control circuit 8 when system conditions seem otherwise right for operation. It prevents false response to any momentary lapse in carrier current during external faults, and it serves as part of the overall coordination delay which has been deliberately provided in the operating sequence of the relaying system so that local tripping cannot be initiated before the fault detecting and carrier-current transmitting means at any remote terminal of the line have been given ample opportunity to set up a blocking signal at the local terminal E.

From the foregoing description of the control circuit 8, it is clear that this portion of the system essentially comprises means to initiate tripping of the local circuit interrupter 13 in response to contemporaneous operations of both MT and ZT, which means is disabled or rendered ineffective to accomplish this end by the associated receiver RM so long as an active remote carrier-current transmitter is in communication therewith. Tripping can therefore take place only when such blocking communication ceases, as when the mho relay is operating and a stopping signal is produced at every terminal of the protected line in response to a true internal phase fault. Once tripping is initiated, the control circuit 8 is "sealed in," until the internal fault is cleared, by an associated circuit which comprises an AND logic unit 49.

One input to the AND unit 49 of the seal-in circuit is supplied, as can be seen in FIG. 1, from a terminal 50a of the control circuit 8 which terminal is energized by the tripping signal. Another input to the same unit is taken from the pulse stretching component T5 which is energized upon operation of the impedance relay ZB. The output of unit 49 sustains both the operating and stopping signals described hereinbefore. Consequently, the AND unit 49 is effective in response to operation of ZB and production of a tripping signal to maintain the control circuit 8 in an active state and to maintain the local carrier-current transmitter TM deactivated. If desired, the output of the AND unit 49 can additionally be used to initiate certain ancillary functions, such as energizing a scheme (represented by a block labeled "BFI" in FIG. 1) for providing a special indication if the local circuit interrupter should fail to open.

Because of a possibility that the above-described directional-comparison protective relaying system may operate incorrectly if an external fault on a parallel electric power transmission line is cleared sequentially, transient blocking means 51 has been provided. The function of this transient blocking means is to temporarily disable the control circuit 8, and thereby prevent tripping of circuit interrupter 13, whenever an external fault in the power system persists for a predetermined length of time, said length being sufficient to ensure proper operation of the relaying system in response to true internal phase faults. Any external power system disturbance occurring while the control circuit is so disabled cannot then cause false operation of the relaying system.

As can be seen in FIG. 1, the transient blocking means 51 includes a timing component T4 connected to the OR logic unit 46 for energizing the terminal 44b of control circuit 8 whenever T4 is turned on. This timing component is a time delay pick-up and dropout circuit arranged to turn on in response to continuous energization by an input signal for an initial interval of said predetermined length (such as 20 milliseconds), and subsequently to turn off upon the expiration of a predetermined interval of time (such as 25 milliseconds) after its input signal is suspended. Accordingly, commencing as soon as the time interval of said predetermined length has elapsed following the application of an input signal to T4, and continuing for at least the duration of said turn-off interval of time, the timing component T4 is effective to activate the NOT unit 47 of the control circuit 8. While thus activated, the NOT unit 47 renders the AND unit 45 inoperative, thereby blocking the tripping signal at the local terminal E of the protected line even should operating signals momentarily be produced concurrently at all of the line terminals.

The input signal to the timing component T4 of the transient blocking means 51 is supplied by an AND logic unit 52 which is energized by the starting signal developed upon operation of the fault responsive distance relay ZB. As is indicated in FIG. 1, the AND unit 52 derives a second energizing input from an OR logic unit 53 which has two parallel inputs: one comprising the blocking signal produced by the local receiver RM; and the other comprising a control signal provided by a NOT logic unit 54 which is energized by the stopping signal referred to hereinbefore. The second-mentioned input to the OR unit 53 therefore reflects the absence of the stopping signal, which means that the local directional sensing mho relay MT (or relay ZT) is not operating. The NOT unit 54 normally enables the AND unit 52 to be turned on in response to a starting signal being applied thereto, but whenever unit 54 is energized by a stopping signal the AND unit 52 will be disabled unless it is concurrently being energized by a blocking signal supplied by RM. With this arrangement an input signal will be supplied to the timing component T4 of the transient blocking means 51 only on the inception of a power system fault (as indictaed by operation of the impedance relay ZB) located externally to the protected line (as indicated, if the fault is "behind" the local terminal E, by the resulting inoperation of MT, or, if the fault is on the far side of a remote terminal of the line, by the presence of a blocking signal due to carrier current being received from an active transmitter at that remote terminal). The timing component then responds as described above to carry out the intended function of the transient blocking means 51.

Figure 2:
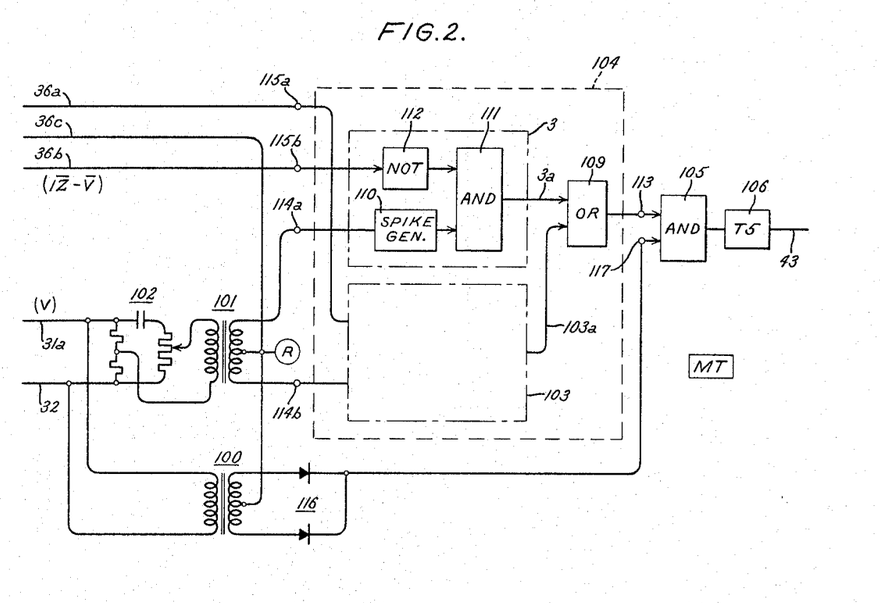
FIG. 2 is a detail block diagram, illustrating one aspect of my invention, of the directional sensing distance relay (MT) which is represented by a single block in FIG. 1.

FIGURE 2

Having explained the overall operation of the directional-comparison protective relaying system shown in FIG. 1, I will now describe with reference to FIG. 2 the particulars of the MT component of the system in its preferred form, this component having been represented in the FIG. 1 schematic diagram by a single block 2. The illustrated relay MT receives an A.C. operating quantity (proportional to $\overline{IZ}-\overline{V}$) from leads 36a, 36b and 36c and an A.C. reference quantity (dependent on steady state transmission line voltage V) from leads 31a and 32. As is shown in FIG. 2, the reference quantity is supplied to two isolating transformers 100 and 101, each having a mid-tapped secondary winding.

The primary winding of transformer 100 is connected directly across leads 31a and 32, while the primary winding of transformer 101, for reasons soon to be explained, is connected to the same leads by way of a phase-shift circuit 102 so designed and adjusted as to retard the A.C. secondary voltage of transformer 101 (referred to hereinafter as the polarizing voltage) 90 electrical degrees with respect to the A.C. reference quantity. The midtaps of the secondary windings of transformers 100 and 101, together with the lead 36c, are connected to a common reference bus (identified by the encircled letter R) of a suitable source of D.C. supply voltage. In view of the phase-shift circuit 102, the magnitude of the polarizing voltage, taken from the secondary of transformer 101, will be only about 30 percent of that of the reference voltage appearing across wires 31a and 32.

As is indicated in FIG. 2, the illustrated relay includes (1) static circuit means 104 for producing an output signal in response to predetermined relationships between the operating and reference quantities being supplied to MT, said relationships being indicative of the incidence of a phase fault within the operating range of this relay, (2) control and protective means 105 for preventing false operation of the relay when an external phase fault occurs in the electric power system near the local terminal of the protected line, and (3) a pulse stretching component 106 spontaneously responsive to any proper operation of 104 for providing a continuous output signal which energizes the lead 43 emanating therefrom.

The static circuit means 104 of the relay MT preferably utilizes the "block-spike" scheme referred to hereinbefore. It therefore is shown as comprising measuring and pulsing means for providing a pulsed output signal if the A.C. operating quantity ($\overline{IZ}-\overline{V}$) has the same polarity as the reference quantity when the instantaneous magnitude of the latter is maximum. More specifically, the measuring and pulsing means is arranged effectively to compare the instantaneous magnitudes of $\overline{IZ}$ and $\overline{V}$ every time the intantaneous magnitude of $\overline{V}$ is maximum, and to produce an output voltage pulse or signal if the comparison reveals that $\overline{IZ}$ at that moment has the same polarity and a higher instantaneous magnitude than $\overline{V}$. The instantaneous magnitude of $\overline{IZ}$ when this comparison is made can be shown to be equal to $IZ \cos(\phi-\theta)$, where $\phi$ is the phase angle by which line current lags transmission line voltage and $\theta$ is the predetermined angle by which $\overline{IZ}$ leads line current. Consequently, the means 104 will operate only if the ratio of line voltage (V) to line current (I), as measured at the local line terminal, is less than $Z \cos(\phi-\theta)$. This charactrizes a mho relay whose operating characteristic when plotted on an R–X impedance diagram is a circle passing through the origin.

In the illustrated embodiment of the mho relay MT, the measuring and pulsing means 104 comprises identical "block-spike" components 3 and 103 connected in parallel to an OR logic unit 109. While the components 3 and 103 can take any suitable form for accomplishing their intended functions, each in its preferred form comprises a spike generator 110 the output of which supplies an input signal for an AND logic unit 111 whose other input is derived from a NOT logic unit 112. (These parts, which have been shown symbolically in FIG. 2, are revealed in still greater detail in FIG. 3, soon to be described.) The output of the AND unit 111 of component 3 is conveyed by a lead 3a to the OR unit 109, and an alternative input (lead 103a) for the latter unit is furnished by the output of a corresponding AND unit in the identical block-spike component 103. As can be seen in FIG. 2, the OR unit 109 is connected to an output terminal 113 of the measuring and pulsing means 104, and an output voltage pulse is there produced whenever the AND unit 111 of either component 3 or 103 is turned on.

The AND unit 111 is turned on each time the generator 110 generates a spike of voltage of positive polarity with respect to the reference bus R, so long as the NOT input 112 to this unit is on at that same moment. (By definition, the unit 112 is "on" in the absence of a positive input signal.) The spike generator is responsive to the polarizing voltage. The polarizing voltage for spike generator 110 in the component 3 is taken from the upper end of the secondary winding of transformer 101 to which this generator is connected, via a terminal 114a as shown. Once every cycle, just as the polarizing voltage being applied to terminal 114a changes from negative to positive relative to the reference bus R, the generator 110 operates to produce a positive voltage spike (also referred to hereinafter as the gating pulse), and it will be observed that in component 3 this moment coincides, because of the 90-degree phase-shift circuit 102 referred to hereinbefore, to the instant that the instantaneous magnitude of the A.C. reference quantity (proportional to V) is at its relatively positive peak.

The gating pulse generated by 110 turns on the AND unit 111 unless the associated NOT unit 112 is then off. The NOT unit 112 is responsive to the A.C. operating quantity supplied to the relay MT, and it is turned off whenever an input voltage of positive polarity relative to the reference bus R is applied thereto. Since turn-on of the AND unit 111 by the spike generator 110 in component 3 is desired if the operating quantity is positive, the NOT unit has been arranged to be supplied by a relatively negative input voltage under such circumstances. This is accomplished by connecting the NOT unit 112 of component 3, via a terminal 115b, to the lower lead 36b, whereby this unit is energized in accordance with the polarity of $\overline{V} - \overline{IZ}$ and is "on" whenever the instantaneous value of IZ is positive and of higher magnitude than V.

As is shown in FIG. 2, corresponding terminals 114b and 115a of the companion block-spike component 103 are connected, respectively, to the lower end of the secondary winding of transformer 101 and to the upper lead 36a. Component 103, which is the same as component 3 internally, serves to produce an output voltage pulse at lead 103a if the operating quantity is negative when the A.C. reference quantity is at its relatively negative peak. Thus the components 3 and 103 are alternatively responsive during the "positive" and "negative" half cycles, respectively, of the quantities supplied thereto, and under operating conditions the measuring and pulsing component 104 derives at its output terminal 113 a succession of output voltage pulses spaced at half-cycle intervals.

In accordance with my invention, the above-mentioned voltage pulses are utilized to energize the control and protective means 105 which is connected to terminal 113. As is indicated in FIG. 2, the control and protective means 105 comprises an AND logic unit which, in addition to the pulsed input received from terminal 113, is provided with a second input derived from the reference quantity by way of the transformer 100, a full-wave rectifier comprising a pair of diodes 116 connected as shown, and a terminal 117. Thus the unit 105 cannot be turned on by a voltage pulse produced by the measuring and pulsing means 104 unless the instantaneous magnitude of the reference quantity is above a predetermined level required for effective energization of this unit. For reasons more fully explained in the following paragraph, this arrangement will block operation of the mho relay MT in the event the peak magnitude of the A.C. reference quantity is so low that operation of the spike generator at the proper instant of time cannot be ensured.

The purpose and advantage of my control and protective means 105 can be readily appreciated by considering the effect that an external fault located close to the local terminal of the protected line will have on the illustrated mho relay MT. Any nearby fault is accompanied by a low voltage condition, that is, the line voltage drops to a relatively low magnitude at the local terminal. Before such an external fault can be cleared in the normal course, several power-frequency cycles will elapse and the memory action of the LC circuit 37a, 37b (see FIG. 1) may well expire, whereupon the reference quantity at the leads 31a and 32 will decay to a low value. The polarizing voltage derived from this quantity and supplied to the spike generator 110 will then have such a low value that production of the gating pulse at precisely the proper moment of time cannot be ensured. This is because the spike generator requires a finite (albeit very small) level of positive-going polarizing voltage to operate, and this critical level may not be attained until many degrees after a voltage zero (which corresponds to the instant of reference voltage maximum) when the polarizing voltage has a low peak magnitude. For example, if the peak magnitude of polarizing voltage were only 0.5 volt, the gating pulse would be produced approximately 30 degrees late. Since the distance-measurement accuracy obtained by a block-spike scheme of the kind being used depends upon the time accuracy of these gating pulses, it is possible for the measuring and pulsing means 104 incorrectly to produce an output voltage pulse under the circumstances being considered. However, my protective means reduces the steady-state sensitivity of the relay (after the effect of the memory circuit expires) and blocks relay operation if the magnitude of the reference quantity should be so low that the above-explained possibility exists.

The AND unit 105 when on energizes the pulse stretching component 106 which is shown in FIG. 2 as a block labeled "T5." The function of this component is to develop a sustained output signal at the connected lead 43 in substantially instantaneous response to the receipt of a signal pulse from the AND unit 105, the output signal being sustained continuously so long as the pulsed signals are recurring at one-half cycle intervals. A circuit diagram revealing in detail the AND unit 105 together with the pulse stretcher 106 in its preferred form has been set forth in FIG. 4, to be described soon hereinafter.

Figure 3:
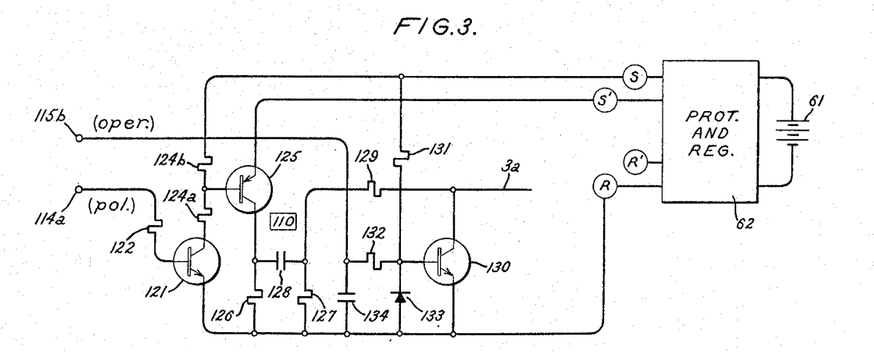
FIG. 3 is a circuit diagram of the components of FIG. 2 which are encompassed by broken line 3.

FIGURE 3

Having described with reference to FIG. 2 the various parts of the spike-block component 3 of the mho relay MT in its preferred form, consideration will next be given to FIG. 3 which reveals actual circuits for carrying out the functions of these parts. The circuitry of component 3, as it is shown in FIG. 3, is the claimed subject matter of a copending patent application S.N. 256,955, Waldron, filed on February 7, 1963 and assigned to the assignee of the present application. This component is supplied, via the terminal 114a, by an A.C. polarizing voltage and, via the terminal 115b, by an A.C. operating voltage, and additionally it receives control power form a source of regulated D.C. supply voltage which comprises, for example, a battery 61 having connected thereto suitable protection and regulating means 62. For the sake of drawing simplicity, I have used throughout the drawings the encircled letters R and S to represent, respectively, the common reference bus (energized from the negative terminal of the battery 61) and a supply voltage bus which is positive with respect to the reference bus. The magnitude of the supply voltage is preferably about 20 volts. For convenience I also derive from this source two other buses which are energized by bias potentials: The negative bias bus, represented by the encircled letter R', has a level of potential slightly more positive than the reference bus R; and the positive bias bus, represented by the encircled S', has a level of potential slightly less positive than the supply voltage bus S.

The circuits illustrated in FIG. 3 include an NPN transistor 121 whose emitter is connected directly to the reference bus R and whose base electrode is connected by way of a current limiting resistor 122 to the terminal 114a for energization by the polarizing voltage. The collector of transistor 121 is connected to the supply voltage bus S by way of a load impedance comprising a pair of resistors 124a and 124b in series. Whenever the polarizing voltage applied to terminal 114a is of positive polarity relative to the reference bus R and its instantaneous magnitude is above the relatively low threshold level required to effect forward current flow in the emitter-base junction of transistor 121, this transistor is active. This threshold level, which is the critical level of positive-going polarizing voltage referred to hereinbefore, is only about 0.2 volt, and since the steady state value of polarizing voltage is much greater (e.g., 24 volts R.M.S.), its attainment normally is substantially coincident with an instant of polarizing voltage zero.

During the intervals of inactivation of the transistor 121, no current of appreciable magnitude can flow in its load impedance and hence there is negligible voltage drop across resistor 124b. But when activated by a positive half cycle of the polarizing voltage applied to terminal 114a, the emitter-collector circuit of transistor 121 readily conducts load current and the junction between resistors 124a and 124b becomes appreciably negative, with respect to the supply voltage bus S. This junction is connected to the base electrode of a normally inactive PNP transistor 125 whose emitter is connected directly to the positive bias bus S' and whose collector is connected through a resistor 126 to the reference bus R. A portion of load current conducted by transistor 121 will follow a path through the emitter-base junction of transistor 125, thereby forward biasing the same, and the latter transistor is turned on and off simultaneously with the former.

As can be seen in FIG. 3, a series RC circuit comprising a resistor 127 and a capacitor 128 of relatively low capacitance is connected across the load resistor 126 of the transistor 125, and the junction between the components of this circuit is connected to the lead 3a via resistor 129. So long as the transistor 125 is off, the level of potential at its collector is substantially the same as that of the reference bus R, and the capacitor 128 of the RC circuit is in a discharged state. The lead 3a is then deenergized. But each time transistor 125 is turned on, its collector potential will be elevated to a level nearly equal to that of the positive bias bus S', and the potential of the junction between resistor 127 and capacitor 128, due to the constant voltage characteristic of the latter, immediately becomes appreciably positive relative to the reference bus R. The capacitor now charges quickly, and the initial voltage across resistor 127 rapidly decays at a rate dependent upon the time constant of the charging circuit. I select a relatively short time constant, such as 0.1 millisecond, whereby the voltage thus produced across resistor 127 in response to the turn-on of transistor 125 endures for only a brief moment. This then is the spike of positive voltage (the gating pulse) referred to hereinbefore, and the combination of the two transistors 121 and 125 and the RC circuit 127, 128 is seen to comprise the spike generator 110 of the spike-block component 3 of the mho relay illustrated in FIG. 2.

The gating pulse generated across resistor 127 in the above-described manner is utilized to energize the outgoing lead 3a. However, the lead 3a is normally clamped to the reference bus R by an NPN transistor 130 connected therebetween. As is shown in FIG. 3, the emitter of transistor 130 is connected directly to R, and its base electrode is connected through a bias resistor 131 to the supply voltage bus S. Consequently forward bias current is normally being supplied to the emitter-base junction of the transistor 130 and the transistor is effective to short down the aforesaid gating pulse and maintain the lead 3a deenergized, unless this result is precluded by the application of a negative-going deactivating signal to the transistor 130. Such a negative-going deactivating signal is derived from the A.C. operating quantity which energizes terminal 115b, the base electrode of transistor 130 being connected to this terminal through a current limiting resistor 132 of much smaller resistance value than the bias resistor 131.

Whenever the voltage applied to terminal 115b is of negative polarity relative to the reference bus R and its instantaneous magnitude is greater than a predetermined critical amount (which is relatively small), the emitter-base junction of transistor 130 will be reverse biased and this transistor is inactive. During an interval of inactivation of the transistor 130, its emitter-collector circuit will be in a relatively high-impedance state and no load current of appreciable magnitude can be conducted thereby. A diode 133 connected in shunt with the emitter-base junction of transistor 130 and poled as shown in FIG. 3 is provided to protect this junction from damagingly high reverse voltage when the operating voltage applied to terminal 115b is at its most negative potential. A capacitor 134 is connected between terminal 115b and the reference bus R to minimize the possibility that transistor 130 might be turned off in response to negative-going extraneous transients appearing at terminal 115b upon the occurrence of an external phase fault in the electric power system beyond the reach of the mho relay MT.

The intervals or time blocks of inactivation of the transistor 130 coincide to the intervals during which the operating quantity $\overline{IZ} - \overline{V}$ is positive, for it is only then that terminal 115b will be negative with respect to the reference bus R. If a gating pulse is generated across resistor 127 during such a block of inactivation, the potential level of the lead 3a is able to rise momentarily in a positive sense with respect to the reference bus, and energizing current can flow into the succeeding circuits being supplied by this lead while the capacitor 128 quickly charges. This energizing current comprises the output signal of the block-spike component 3 which is shown in FIG. 3, and the circuits supplied by the lead 3a are preferably designed for very sensitive response thereto.

Figure 4:
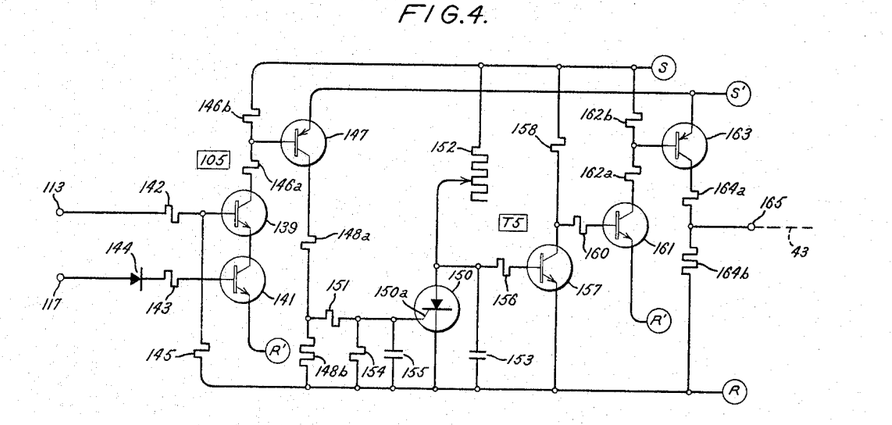
FIG. 4 is a circuit diagram of other components of the relay shown in FIG. 2.

FIGURE 4

Turning next to FIG. 4, I have there shown the preferred circuitry of the AND logic unit 105 and the pulse stretching component 106 which are part of the mho relay MT illustrated in block form in FIG. 2. The AND unit 105 comprises a pair of NPN transistors 139 and 141 disposed in tandem. As can be seen in FIG. 4, the base electrode of transistor 139 is connected by way of a current limiting resistor 142 to the terminal 113 for energization by the pulsating output signal produced upon operation of the preceding static circuit means 104 (FIG. 2), while the base electrode of the transistor 141 is connected through a resistor 143 and a diode 144 to the terminal 117 for energization by the rectified voltage derived from the reference quantity across leads 31a and 32, as shown in FIG. 2.

The emitter of the transistor 141, as is shown in FIG. 4, is connected directly to the negative bias bus R', and this transistor is maintained normally inactive whenever the terminal 117 is deenergized (at reference bus potential). The collector of transistor 141 and the emitter of transistor 139 are interconnected as shown. The collector of transistor 139 is connected to the supply voltage bus S by way of a load impedance comprising a pair of resistors 146a and 146b in series, and a base resistor 145 is connected between the base electrode of this transistor and the reference bus R. Preferably a silicon transistor is used for 139 and a germanium transistor is used for 141.

So long as either one of the transistors 139 and 141 is in a non-conductive state (inactive), no current of appreciable magnitude can flow in the load impedance and hence there is negligible voltage drop across resistor 146b. But whenever both of these transistors, which comprise the AND unit 105, are concurrently active, their serially connected emitter-collector circuits readily conduct load current and the junction between resistors 146a and 146b becomes appreciably negative, with respect to the supply voltage bus S. This junction is connected to the base electrode of a normally inactive PNP transistor 147, whose emitter is connected directly to the positive bias bus S' and whose collector is connected through two voltage dividing resistors 148a and 148b to the reference bus R, the latter resistor having a much greater resistance value than the former. A portion of the load current being conducted jointly by the transistors 139 and 141 follows a path through the emitter-base junction of transistor 147, thereby forward biasing the same, and the latter transistor is turned on simultaneously with the AND unit 105. Each time the transistor 147 is thus turned on, its collector current produces at the junction of resistors 148a and 148b a signal pulse which energizes the pulse stretcher T5 soon to be described.

It is apparent in FIG. 4 that in order for boh transistors 139 and 141 to be active, the terminals 113 and 117 have to be simultaneously energized by voltage signals of positive polarity, relative to the reference bus R. Transistor 139 will be forward biased each time a pulsed signal is applied to terminal 113 by operation of the static circuit means 104 as described above. However, no significant amount of collector current can be conducted by the transistor 139 unless the companion transistor 141 is active at the same time. In other words, unless transistor 141 also is active the transistor 139 is disabled and the AND unit 105 cannot be turned on.

The transistor 141 is active (turned on) whenever the instantaneous magnitude of the voltage which energizes terminal 117 exceeds a critical threshold level required to effect forward current flow in the emitter-base junction of this transistor. The critical threshold level is dependent upon the amount of negative bias voltage and the selection of diode 144, and the parameters are preferably so selected that this turn-on level is about two volts. This threshold voltage determines the level which must be attained by the instantaneous magnitude of reference voltage for effective energization of the AND unit 105. It is apparent therefore that the transistor 141 performs the above-described protective function of blocking relay operation under sustained low voltage conditions. The fact that this transistor is intermittently inactive, due to the unfiltered nature of the rectified voltage applied to terminal 117, does not interfere with proper operation of the relay, since the pulsed operating signals at terminal 113 are timed to coincide with those moments when the instantaneous magnitude of the rectified voltage (derived from the reference quantity) is at its peak.

The detail circuitry of the preferred embodiment of the pulse stretching component T5 which is energized by the signal pulse developed at the junction of resistors 148a and 148b is also shown in FIG. 4. This particular circuit is the claimed subject matter of the above-cited copending patent application S.N. 321,072, Scharf. As can be seen in FIG. 4, the pulse stretcher comprises a solid state controlled rectifier 150 whose gate electrode 150a is connected by way of a current limiting resistor 151 to the junction of resistors 148a and 148b. The cathode of the controlled rectifier 150 is connected directly to the reference bus R, and its anode is connected to the junction of a rheostat 152 and capacitor 153 which are interconnected in series between the supply voltage bus S and the reference bus R. The controlled rectifier 150 is normally "open," and the capacitor 153 is normally charged. A parallel combination of a resistor 154 and a surge suppressing capacitor 155 of relatively small capacitance is connected between the cathode and gate electrode of the controlled rectifier 150 to prevent activation of this device by stray voltage transients or spurious surges.

Until triggered or activated by a small "gate current" in its gate electrode 150a, the controlled rectifier 150 blocks current flow and hence is in effect an open circuit. When so triggered, however, it will abruptly change to a low-forward-impedance state in which its anode-cathode circuit can readily conduct load current. So long as the anode current then exceeds a predetermined minimum value (the "holding current") required to sustain conduction in a controlled rectifier of the type illustrated, this device remains active even after the gate signal is removed.

Whenever the pulse stretching component is momentarily energized by a signal such as that produced when transistor 147 turns on upon operation of the AND unit 105 as described above, gate current of appropriate magnitude and duration for triggering the controlled rectifier 150 is supplied to this device. The controlled rectifier 150 immediately "closes," thereby discharging the capacitor 153 completely, and the capacitor discharge current rapidly decays to a value less than holding current. As a result, there is insufficient anode current in the controlled rectifier to sustain conduction after the gate signal is removed, and the controlled rectifier 150 will immediately revert to its open, inactive state whenever the AND unit 105 turns off. The capacitor 153 then responds by recharging through the rheostat 152, the time constant of this recharging operation being determined by the rheostat adjustment.

The voltage level across capacitor 153 is utilized to control the succeeding portions of the circuit shown in FIG. 4. Connected to the junction of rheostat 152 and capacitor 153, by way of a current limiting resistor 156, is the base electrode of an NPN transistor 157 whose emitter is connected directly to the reference bus R and whose collector is connected through a load resistor 158 to the supply voltage bus S. The collector of transistor 157 is also connected through a current limiting resistor 160 to the base electrode of a normally inactive NPN transistor 161. The emitter of the latter transistor is connected directly to the negative bias bus R', while its collector is connected to the supply voltage bus S by way of a load impedance comprising a pair of resistors 162a and 162b in series.

So long as the capacitor 153 is in its normally charged condition, the emitter-base junction of transistor 157 is forward biased and this transistor is in a conductive (active) state. As a result, the emitter-base junction of the companion transistor 161 is reverse biased, and this transistor is "off." The capacitor 153, however, will become discharged whenever the controlled rectifier 150 is closed in response to an energizing signal pulse being produced at the junction of resistors 148a and 148b, and under these circumstances forward bias current in the emitter-base junction of transistor 157 can no longer be sustained, whereby this transistor is inactive or turned off. The transistor 157 will remain off while the capacitor 153 remains discharged and for a predetermined additional interval of time commencing as soon as the capacitor begins to recharge in response to the opening of the controlled rectifier 150. This predetermined time interval, which is dependent upon the time constant of the charging circuit of capacitor 153 and can be made 9 milliseconds, for example, expires when the voltage across the recharging capacitor 153 attains the threshold level required to effect forward current flow in the emitter-base junction of transistor 157, whereupon this transistor is again turned on.

Throughout the period that the transistor 157 is off, the companion transistor 161 is on. As can be seen in FIG. 4, the junction of the resistors 162a and 162b in the load circuit of transistor 161 is connected to the base electrode of a normally inactive PNP transistor 163 whose emitter is connected to the positive bias bus S' and whose collector is connected through two voltage dividing resistors 164a and 164b to the reference bus R, resistor 164b having a much greater resistance value than 164a. Whenever transistor 161 is on, a portion of its collector current will follow a path through the emitter-base junction of transistor 163, thereby forward biasing the same, and the latter transistor is turned on and off simultaneously with the former. An output terminal 165 connected to the junction of resistors 164a and 164b is at substantially the same level of potential as the reference bus R while the transistor 163 is off. But whenever transistor 163 is turned on, as it is throughout the periods of inactivation of transistor 157, there is developed across resistor 164b a D.C. voltage of substantially constant magnitude nearly equal to the magnitude of the supply voltage, and this voltage, taken from terminal 165 by the lead 43 which is connected thereto, comprises the output signal of the pulse stretching component T5 shown in FIG. 4.

It will be apparent from the foregoing description of FIG. 4 that the pulse stretcher operates to produce an output signal at the lead 43 in substantially instantaneous response to operation of the AND unit 105 and to sustain this output signal for a predetermined minimum time interval thereafter. This predetermined time interval is dependent upon the time constant of the charging circuit for capacitor 153, and for my present purposes this time constant is so selected, by proper adjustment of the rheostat 152, that the aforesaid time interval is equal to approximately 9 milliseconds (slightly longer than one-half of a power frequency cycle, on a 60 c.p.s. basis). It will be observed that under operating conditions the AND unit 105 is being turned on periodically by pulsed signals recurring at half-cycle intervals at the terminal 113, whereby the controlled rectifier 150 is repeatedly triggered and the capacitor 153 completely discharged prior to the expiration of a full 9-millisecond interval. Consequently, the output signal of the pulse stretcher T5 will be sustained without interruption until the operating condition terminates and the AND unit 105 has remained off continuously for 9 milliseconds.

Returning again to FIG. 2, it is now apparent that the control and protective means of my invention will block operation of the illustrated mho relay MT if the static circuit means 104 should produce an output signal at terminal 113 while the reference quantity being supplied to the relay, via leads 31a and 32, is so low that the propriety of this signal is in doubt. There is no interference, however, with the relay's proper operation in response to low-voltage transmission line faults occurring within its true operating range, because the memory circuit 37a, 37b (to which the lead 31a is connected as is shown in FIG. 1), having a natural frequency of oscillation approximately equal to the power frequency, will prevent the reference quantity from spontaneously decaying under such circumstances.

There are certain other power system disturbances that can cause false operation of the static circuit means 104. When the line-voltage derived reference quantity is initially applied to the relay, after a period of absence, the spike generator 110 in one of the block-spike components 3, 103 of the static circuit means 104 will immediately generate a gating pulse regardless of the instantaneous magnitude of the reference quantity at that time. Since this initial gating pulse can come anywhere in the cycle, it may easily result in a pulsed output signal being erroneously produced at terminal 113. This tendency to operate falsely in response to the application or reapplication of the reference quantity will exist, for example, when the line voltage recovers following the clearing of a nearby external fault. It can also exist, at any line terminal whose means for deriving the line-voltage dependent relaying quantities is connected to the power system conductors on the protected-line side of the terminal, upon returning the line to service. False response by the mho relay MT under such circumstances will not, however, cause false operation of the previously described protective relaying system in which this relay is used. Misoperation of the system following the clearing of a nearby external fault is prevented by the transient blocking means 51 shown in FIG. 1 and described hereinbefore, while misoperation of the system upon returning a sound line to service is prevented because the supervising distance relay ZT will not operate in this circumstance.

A mho relay of the kind illustrated in FIG. 2 may be used in settings other than the one in which it is particularly shown in FIG. 1. For example, I contemplate its being used to provide "first zone" protection, where operation of the relay is intended substantially instantaneously to effect the initiation of a circuit opening operation by the local circuit interrupter. Therefore I have provided another embodiment of the relay which is completely secure even under the circumstances outlined in the preceding paragraph. This alternative embodiment is illustrated in FIG. 5 which will now be described.

Figure 5:
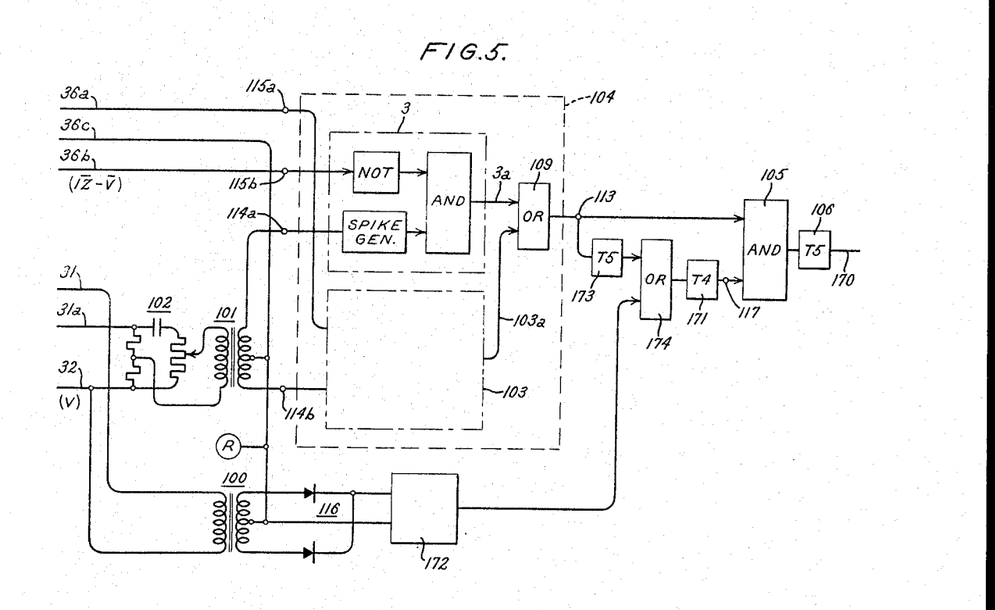
FIG. 5 is a block diagram, similar to FIG. 2, of a distance relay constructed in accordance with an alternative embodiment of my invention.

FIGURE 5

The static mho relay shown in FIG. 5 is similar in most respects to that shown in FIG. 2, and the same reference characters have been used to identify corresponding parts. Line-derived operating and reference quantities for this relay are again supplied by the leads 36a–36c and 31a, 32, respectively, and its output signal is conveyed by a lead 170 to appropriate means controlled thereby, such as a high-speed static switch (not shown) for completing a trip coil energizing circuit of an electric circuit interrupter. The principal difference between the relays shown in FIGS. 2 and 5 resides in the control and protective means which, in FIG. 5, includes time delay means 171 disposed for energization upon operation of a level detector 172 or, alternatively, upon operation of a pulse stretcher 173, the level detector and pulse stretcher being connected in parallel to the time delay means 171 by way of an OR logic unit 174. The level detector 172 is connected to the full-wave rectifier 116 for energization by a rectified votage which is dependent on transmission line voltage, with the isolating transformer 100 in this instance being connected to the potential transformer secondary circuit 31 and 32 ahead of the memory circuit 37a, 37b (FIG. 1). The pulse stretcher 173 is connected to terminal 113 for energization by the pulsed output signal there produced upon operation of the static circuit means 104. As is indicated in FIG. 5, the output of the time delay means 171 energizes the terminal 117 and hence affects activation of the AND unit 105 of the control and protective means. The preferred construction and functions of the respective components 171, 172 and 173 of the FIG. 5 embodiment of my invention will now be explained.

The time delay means 171, which is shown in FIG. 5 as a block labeled "T4," comprises a time delay pickup and dropout circuit arranged to turn on in response to continuous energization by an input signal for a predetermined short interval of time (such as one millisecond) and subsequently to turn off upon the expiration of another predetermined length of time (such as 20 milliseconds) after its energizing signal is suspended. Its construction may, for example, be like that of the T4 circuit fully described in my copending patent application S.N. 249,-791, filed on Jan. 7, 1963, and assigned to the assignee of the present application. Whenever the time delay means 171 is turned on, it derives a relatively positive output signal which is applied to terminal 117, and the transistor 141 in the AND unit 105 (see FIG. 4) will be activated thereby.

A control signal of appropriate character to turn on the time delay means 171 is supplied thereto, by way of the OR unit 174, upon operation of the level detector 172, and it should now be apparent that the time delay means serves to delay effective energization of the AND unit 105 for the predetermined 1-millisecond turn-on interval after the level detector 172 initially operates, and to prolong the effective energization of 105 for at least the predetermined 20-millisecond turn-off time thereafter. The level detector 172, which is shown in block form in FIG. 5, comprises a level-sensitive switching device which will "pick up" (that is, become operative to produce a relatively positive control signal of constant magnitude) in substantially instantaneous response to the magnitude of its input voltage attaining a predetermined critical level. I prefer to use for this purpose a device like that used for the G2 fault detector in my aforesaid copending patent application S.N. 249,791. The level detector 172 is preferably arranged so that it is in operation whenever the instantaneous magnitude of the line-voltage derived quantity energizing it equals or exceeds a critical level which corresponds to potential transformer secondary voltage of approximately 10 volts R.M.S., a value which will prevent response to expectable stray voltages. The transistor 141 in the AND unit 105 consequently is activated in response to energization of the level detector 172 by voltage having an instantaneous magnitude above this predetermined level.

The combination of the time delay means 171 and the level detector 172 will be seen to comprise means for preventing the AND unit 105 from turning on, following any 20-millisecond period throughout which the level detector 172 has been continuously inoperative, for an interval of one millisecond after line voltage rises above a value corresponding to the critical magnitude of the rectified voltage to which the level detector operatively responds. Operation of the mho relay illustrated in FIG. 5 is then blocked even if the static circuit means 104 were falsely to produce an output signal pulse during this initial short interval. Subsequently, if the control signal supplied by the level detector 172 has subsisted for one millisecond, the time delay means 171 derives its output signal which enables the AND unit 105 to be turned on in response to the later production of an output pulse by the static circuit means, and this output signal at terminal 117 is sustained by 171 while the control signal continues to subsist and for 20 milliseconds thereafter. The 20-millisecond turn-off delay of the time delay means 171 ensures proper high-speed relay response to any low-voltage transmission line faults occurring within its true operating range.

The pulse stretcher 173, which is shown in FIG. 5, as a block labeled "T5" and preferably comprises the T5 circuit shown in FIG. 4 and described hereinbefore, also provides a relatively positive control signal for energizing the time delay means 171. The pulse stretcher will operate substantially instantaneously to develop an appropriate signal for this purpose whenever energized by a pulsed output signal of the static circuit means 104, and its operation is thereafter sustained for a predetermined time interval which is longer than the turn-on time of 171, being selected in this instance to be approximately two milliseconds. As is indicated in FIG. 5, the time delay means 171 responds to operation of the pulse stretcher 173, on the elapse of its 1-millisecond turn-on delay, by effectively energizing the AND unit 105 regardless of the magnitude of line voltage.

The pulse stretcher 173 is provided to ensure proper operation of the illustrated relay, when used at a line terminal whose line-voltage responsive means are connected to the power system conductors on the protected-line side of the local circuit breaker, in the event that the circuit breaker is closed while a fault exists on the protected line near the local terminal. In this particular circumstance the line-derived voltage energizing the level detector 172 may not rise to the critical 10-volt level required for operation thereof, yet activation of the AND unit 105 is desired. This activation is made possible by the pulse stretcher 173 which, in combination with the time delay means 171 and the unit 105 will prevent operation of the relay in response to the initial output pulse produced by the static circuit means 104 (the propriety of this initial pulse being always in doubt) and thereafter permit relay operation upon the production of a second such pulse.

While I have shown and described preferred forms of my invention by way of illustration, various modifications will occur to those skilled in the art. I contemplate therefore by the claims which conclude this specification to cover all such modifications as fall within the true spirit and scope of my invention.

What I claim as new and desire to secure by Letters Patent of the United States is:

1. A distance relay for initiating a predetermined control function in response to the occurrence of a fault on an electric power transmission line, comprising:
   (a) means adapted to be coupled to the line for operation whenever the relationship between line-voltage and line-current derived quantities supplied thereto indicates that a line fault has occurred within its operating range;
   (b) control means connected to said first-mentioned means and responsive to the operation thereof for effecting the initiation of the predetermined control function; and
   (c) protective means adapted to be coupled to the line and connected to said control means for disabling said control means, thereby rendering it ineffective to initiate the predetermined control function, in response to the instantaneous magnitude of a predetermined line-voltage derived quantity being below a predetermined level.

2. A distance relay for protecting an electric power transmission line comprising;
   (a) means adapted to be energized by a reference voltage derived from transmission line voltage and by an operating voltage comprising the vectorial combination of two component voltages derived respectively from line voltage and current for operation when the relationship between the component voltages is indicative of a fault condition on the protected line;
   (b) protective means adapted to be energized by a voltage dependent on transmission line voltage for activation in response to the instantaneous magnitude of said dependent voltage exceeding a predetermined level; and
   (c) control means connected to both said first-mentioned means and said protective means for initiating a predetermined control function in response to operation of the former and the contemporaneous activation of the latter.

3. The distance relay of claim 2 in which the protective means includes time delay means for delaying initial activation of the protective means, following any period of inactivation thereof, for a predetermined short interval of time after the instantaneous magnitude of the dependent voltage attains said predetermined level.

4. The distance relay of claim 3 in which the time delay means is additionally effective to prolong activation of the protective means, once activated, for a predetermined minimum length of time.

5. The distance relay of claim 3 in which the protective means is also connected to the first-mentioned means for activation, on the elapse of said predetermined short interval of time, in response to operation of said first-mentioned means.

6. A distance relay for initiating a predetermined control function in response to the occurrence of a fault on an electric power transmission line, comprising:
   (a) first means adapted to be coupled to the line for producing a first output signal whenever the relationship between line-voltage and line-current derived quantities supplied thereto indicates that a line fault has occurred within its operating range;
   (b) second means adapted to be coupled to the line for producing a first control signal whenever the instantaneous magnitude of a line-voltage derived quantity supplied thereto is above a predetermined level;
   (c) time delay means connected to said second means for deriving a second output signal in response to the subsistence of said control signal for a predetermined interval of time; and
   (d) means connected to said first means and to said time delay means and supplied by their respective output signals for initiating the predetermined control function in response to the contemporaneous presence of said output signals.

7. The distance relay of claim 6 in which the time delay means is arranged to sustain the second output signal, once produced, for a predetermined minimum length of time.

8. The distance relay of claim 7 in which there is provided additional means connected to the first means for developing and sustaining another control signal in response to the production of the first output signal, and in which the time delay means is connected to the additional means as well as to the second means for deriving the second output signal in response to the subsistence of either control signal for said predetermined time interval.

9. A static mho relay for protecting an electric power transmission line comprising:
   (a) first means adapted to be coupled to the line for developing a first electric quantity dependent on line voltage;
   (b) second means adapted to be coupled to the line for developing a second electric quantity dependent on the vectorial combination of two different electric quantities derived from line voltage and current, respectively;
   (c) static circuit means connected to said first and second means for producing an output signal in response to predetermined relationships between said developed quantities, said predetermined relationships being indicative of the occurrence of a fault on the protected line;
(d) control means connected to said static circuit means for initiating a predetermined control function in response to the production of said output signal; and
(e) normally inactive protective means connected to said control means and to said first means for disabling said control means and thereby preventing the initiation of said predetermined control function while inactive, said protective means being rendered active whenever the instantaneous magnitude of said first electric quantity is greater than a predetermined level.

10. The mho relay of claim 9 in which the first means includes a memory circuit so arranged as to delay the decrase in the magnitude of the first electric quantity in response to any decrease in line voltage magnitude.

11. A static mho relay for protecting an electric power transmission line comprising:
(a) first means adapted to be coupled to the line for developing a first electric quantity dependent on line voltage;
(b) second means adapted to be coupled to the line for developing a second electric quantity dependent on the vectorial combination of two different electric quantities derived from line voltage and current, respectively;
(c) static circuit means connected to said first and second means for producing an output signal in response to predetermined relationships between said developed quantities, said predetermined relationships being indicative of the occurrence of a fault on the protected line;
(d) level detecting means connected to said first means for producing a control signal in response to the line voltage magnitude exceeding a predetermined level;
(e) time delay means connected to said level detecting means for energization by said control signal, said time delay means being operative to derive and sustain another output signal after being continuously energized by said control signal for a predetermined interval of time; and
(f) means connected to said static circuit means and to said time delay means for initiating a predetermined control function in response to energization by both of said output signals contemporaneously.

12. the mho relay of claim 11 in which there is provided pulse stretching means connected to the static circuit means for developing and sustaining an additional control signal whenever an output signal is produced by the static circuit means, the time delay means being connected to said pulse stretching means for operation in response to being continuously energized by said additional control signal for said predetermined time interval.

13. A static mho relay for protecting an A.C. electric power transmission line comprising:
(a) first means adapted to be coupled to the line for developing a polarizing voltage dependent on line voltage;
(b) second means adapted to be coupled to the line for developing an operating voltage dependent on the vector difference between two component voltages proportional to line current and voltage, respectively;
(c) static circuit means connected to said first and second means for energization by said polarizing and operating voltages, said static circuit means including means controlled by the polarizing voltage for periodically enabling the static circuit means to produce a pulsed output signal when the line voltage attains a predetermined instant in successive cycles thereof if the operating voltage is then indicative of a fault condition on the protected line;
(d) control means connected to said static circuit means for energization by its output signal, said control means being operative to initiate a predetermined control function in response to energization by said output signal; and
(e) protective means connected to said control means and adapted to be coupled to the line, said protective means being responsive to line voltage magnitude and being arranged to disable the control means, thereby preventing the initiation of said control function, when line voltage magnitude is below a predetermined level.

14. The relay of claim 13 in which the protective means includes time delay means for prolonging the disabling effect of the protective means for a predetermined short interval of time after line voltage magnitude increases from below to above said predetermined level.

15. The relay of claim 13 in which the protective means includes means for delaying the disabling effect of the protective means in response to an abrupt decrease in line voltage magnitude from above to below said predetermined level.

References Cited by the Examiner
UNITED STATES PATENTS

| | | | |
|---|---|---|---|
| 3,170,088 | 2/1965 | Coutsourakis | 317—22 |
| 3,201,651 | 8/1965 | Calhoun | 317—49 X |

MILTON O. HIRSHFIELD, *Primary Examiner.*

LEE T. HIX, *Examiner.*

J. D. TRAMMELL, *Assistant Examiner.*